(12) United States Patent
Wild et al.

(10) Patent No.: US 7,929,210 B2
(45) Date of Patent: Apr. 19, 2011

(54) OPTICALLY VARIABLE ELEMENT WITH PARTIAL TRANSPARENT ELEMENT

(75) Inventors: Heinrich Wild, Herzogenaurach (DE); Ludwig Brehm, Adelsdorf (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 0 days.

(21) Appl. No.: 12/386,142

(22) Filed: Apr. 14, 2009

(65) Prior Publication Data

US 2009/0201586 A1    Aug. 13, 2009

Related U.S. Application Data

(63) Continuation of application No. 10/514,371, filed as application No. PCT/EP03/04022 on Apr. 17, 2003, now Pat. No. 7,535,641.

(30) Foreign Application Priority Data

May 14, 2002 (EP) ..................................... 02010729

(51) Int. Cl.
*G02B 1/10* (2006.01)
(52) U.S. Cl. ........... 359/585; 359/566; 359/576; 283/85
(58) Field of Classification Search .................. None
See application file for complete search history.

(56) References Cited

U.S. PATENT DOCUMENTS

| | | | |
|---|---|---|---|
| 4,629,647 | A | 12/1986 | Sander |
| 4,705,300 | A | 11/1987 | Berning et al. |
| 5,093,184 | A | 3/1992 | Edwards |
| 5,801,857 | A | 9/1998 | Heckenkamp et al. |
| 6,114,018 | A | 9/2000 | Phillips et al. |
| 2002/0027361 | A1 | 3/2002 | Hardwick et al. |
| 2004/0101676 | A1 | 5/2004 | Phillips et al. |

FOREIGN PATENT DOCUMENTS

| | | |
|---|---|---|
| DE | 4334848 | 1/1995 |
| DE | 10047450 | 4/2002 |
| EP | 1022625 | 7/2000 |
| JP | 9156198 | 6/1997 |
| WO | WO9401291 | 1/1994 |
| WO | WO0103945 | 1/2001 |
| WO | WO0200445 | 1/2002 |

*Primary Examiner* — Arnel C Lavarias
(74) *Attorney, Agent, or Firm* — Hoffman & Baron, LLP (57) ABSTRACT

An optically variable element, in particular an optically variable safeguard element for safeguarding banknotes, credit cards and the like, and a security product and a foil, in particular an embossing foil or a laminating foil, having such an optically variable element. The optically variable element has a thin film for producing color shifts by means of an interference and/or a reflective layer. The optically variable element further has a transparent window and the thin film and/or the reflective layer is respectively in the form of a partial element, namely a partial thin film element or a partial reflective element, wherein the partial element or elements surround the surface region of the transparent window.

20 Claims, 6 Drawing Sheets

OPTICALLY VARIABLE ELEMENT WITH PARTIAL TRANSPARENT ELEMENT

CROSS-REFERENCE TO RELATED APPLICATIONS

This application is a continuation application of U.S. application Ser. No. 10/514,371, filed on Dec. 20, 2004, which claims priority based on an International Application filed under the Patent Cooperation Treaty, PCT/EP2003/040222, filed on Apr. 17, 2003, and European Application No. EP02010729.8, filed on May 14, 2002, which are incorporated herein by reference in their entirety for all purposes.

BACKGROUND OF THE INVENTION

The invention concerns an optically variable element, in particular an optically variable security element for safeguarding banknotes, credit cards and the like, which has a thin film for producing color shifts by means of interference and/or a reflective layer. The invention further concerns a security product and a foil, in particular an embossing foil or a laminating foil, which has such an optically variable element.

Optically variable elements are frequently used to make it difficult to copy and misuse documents or products and if possible to prevent that from happening. Optically variable elements are frequently used for safeguarding documents, banknotes, credit cards, cash cards and the like.

In order to make it difficult to copy optically variable elements, it is known for an optically variable element to be provided with a thin film layer succession which produces color shifts by means of interference, in dependence on the viewing angle.

WO 01/03945 A1 describes a security product having a transparent substrate, to one side of which is applied a thin film which produces a perceptible color shift in dependence on the change in the angle of view. The thin film comprises an absorption layer which is applied to the transparent substrate and a dielectric layer which is applied to the absorption layer. The absorption layer includes a material which is made up from one of the following materials or a combination of those materials: chromium, nickel, palladium, titanium, cobalt, iron, tungsten, molybdenum, iron oxide or carbon. The dielectric layer comprises one of the following materials or a combination of the following materials: silicon, aluminum oxide, magnesium fluoride, aluminum fluoride, barium fluoride, calcium fluoride or lithium fluoride.

In order further to increase the level of safeguard against copying, a diffraction pattern is embossed on the side of the transparent substrate, which is in opposite relationship to the thin film layer succession. That diffraction pattern acts as a diffraction grating so that for example the illusion of a three-dimensional image can be produced for the viewer, by means of that two-dimensional pattern.

It is further proposed that the diffractive pattern be applied by embossing to the side of the transparent substrate to which the thin film layers are also applied.

Those two embodiments of an optically variable element provide that, at each location of the optically variable element, the optical effects produced by the thin film layers and the optical effects produced by the diffractive pattern are superimposed and this therefore overall affords an optical effect which is difficult to imitate and copy.

The invention is now based on an optically variable element as is described in WO 02/00445 A1.

The optically variable element comprises here a plurality of layers which are arranged generally in mutually superposed relationship. The optically variable element has on the one hand a thin film which produces the optical effect, already described above, of a color change which is dependent on the angle of view. In addition the optically variable element has a replication layer into which a relief structure is embossed. That relief structure produces a further optical effect, namely the diffraction effect which has already been described hereinbefore and by means of which holograms and the like can be represented. In that respect, in regard to production procedure, firstly the thin film layers are applied to the replication layer and then the relief structure is embossed thereon.

As an alternative thereto, WO 02/00445 A1 describes that the optical effect produced by the thin film structure and the optical effect produced by the relief structure are decoupled from each other. Two operating procedures are proposed for that purpose.

On the one hand it is proposed that an opaque layer is applied between the relief structure which produces a holographic image by means of diffraction and the thin film which produces a color change effect. The relief structure is screened from the thin film structure by means of that opaque layer. The second possible option involves arranging two or more layers of a substantially transparent material between the relief structure producing a holographic image by diffraction and the thin film layers. Those layers can include one or more highly refractive layers and an adhesive layer. Those layers provide for an increase in reflection and thus the strength of light in the region of the relief structure producing a holographic image.

In this respect, such a variable optical element can be produced as follows: firstly a pattern is embossed into a holographic foil. That foil is then provided in region-wise manner with a metal layer. The thin film layers are then vapor-deposited in succession. Lastly, a metal layer is applied, over the full surface area.

A further possible option involves providing a prefabricated thin film layer succession with an embossable lacquer and then embossing the relief structure into that lacquer. It is further proposed that such prefabricated thin film layers can be glued to prefabricated microstructures.

WO 02/00445 A1 thus describes either using security elements in which the optical effect produced by diffractive structures and the optical effect produced by thin film structures are coupled together, or using security elements in which the optical effect produced by diffractive structures and the optical effect produced by thin film layers are decoupled from each other.

SUMMARY OF THE INVENTION

Now, the object of the invention is to make it difficult to imitate and copy optically variable elements and thus to improve the anti-forgery security of security products.

That object is attained by an optically variable element, in particular an optically variable safeguard element for safeguarding banknotes, credit cards and the like, which has a thin film for producing color shifts by means of interference and/or a reflective layer, wherein the optically variable element has a transparent window and the thin film and/or the reflective layer is respectively in the form of a partial element, namely a partial thin film element or a partial reflective layer, wherein the partial element or elements surround the surface region of the transparent window. That object is further attained by a security product and a foil, in particular an embossing foil or a laminating foil, which has such an optically variable element.

The invention achieves the advantage that an optically variable element according to the invention is substantially more difficult to copy than the optically variable elements known in the state of the art. As a result, the anti-forgery security of security products provided with an optically variable element of the configuration according to the invention is considerably increased. In particular the level of anti-forgery security is far increased in that respect in comparison with surface elements of a sandwich-like structure.

Thus for example the optically variable element described in WO 02/00445 A1—as described in WO 02/00445 A1 as a possible mode of manufacture—can be imitated by a prefabricated thin film foil being processed with an embossing stamp, with which a diffractive structure is embossed into the thin film foil. That is no longer possible with an optically variable element designed in accordance with the invention: the partial application of a partial window which is surrounded by a partial reflective layer and/or a partial thin film element requires a high level of technology complication and expenditure. In comparison with a prefabricated thin film foil the partial thin film element produced in that way represents an individualised element so that imitation of the optically variable element is no longer possible, starting from a prefabricated thin film layer succession.

Further advantages in relation to previous individual representations or mutually superposed surface elements lie in better optical integration into the overall element to be protected, the existence of the possibility of making patterns, texts and codes arranged under the optically variable element specifically and targetedly usable and thus providing an additional security feature, the specifically targeted geometrical arrangement of functional windows (machine-readability, personal data and so forth) and the choice, which can be better matched, in respect of the physical-chemical properties of the partially arranged individual elements (corrosion, intermediate layer adhesion and the like).

Advantageous configurations of the invention are set forth in the appendant claims.

It is desirable if the optically variable element has one or more further layers which extend over the surface region of the transparent window and over the surface region of the partial thin film element and/or the partial reflective layer. Thus the optically variable element preferably has a replication layer, a protective lacquer layer and/or an adhesive layer which extends over the surface region of the transparent window and over the surface region of the partial thin film element and/or the partial reflective layer. In that case the layers may also involve the full surface area.

The level of anti-forgery security can be increased if a diffractive structure, in particular for producing diffraction effects, is applied in the surface region of the transparent window. For example holograms can be produced by means of such a diffractive structure. It is possible for that diffractive structure to occupy the total surface region of the transparent window. Imitation of that security feature is made difficult however if the diffractive structure occupies only a part of the surface region of the transparent window and thus forms a partial diffractive element, in relation to the transparent window. That partial application means that inaccuracies in register relationship, which under some circumstances can cause a blur effect in the boundary region between the transparent window and the surrounding partial elements, are more easily discernible to the viewer.

Imitation of the optically variable element is made further considerably more difficult if the optically variable element is provided with a diffractive structure which extends both over a surface region of the transparent window and also over a surface region of the partial thin film element and/or the partial reflective layer. Thus the diffractive structure extends over the boundary line between the transparent window and the surrounding partial element or elements. If, in an attempt at imitation, the attempt is made to use an embossing stamp to emboss a diffractive structure extending over that boundary line, the diffractive structure is embossed to a differing depth by virtue of the differing layer structure of those different partial elements (transparent window, partial reflective layer, partial thin film element). In that way at least the boundary line within the hologram represented by the diffractive structure, becomes discernible, for example due to a fault occurring in the hologram. Thus such an attempt at imitation can be clearly perceived by the viewer and can be identified as a forgery.

That effect can be increased if there are differences in level between the surface region of the transparent window and that of the reflective layer and/or that of the partial thin film element, that is to say the optically variable element in those surface regions is of a different overall layer thickness. That effect can also be enhanced by virtue of the choice of the materials selected in those regions (for example differing hardness) and by virtue of the layer composition.

It is advantageous if the transparent window has a partial transparent element with specific optical properties. That provides that different partial elements (partial transparent element, partial thin film element, partial reflective layer) follow each other. As already indicated above, that makes it difficult to imitate the optically variable element in relation to the known optically variable security elements which are of a sandwich-like structure. The partial transparent element, as an additional security feature, can have a colored transmission layer or can have scattering properties.

A possible way, which enjoys production-engineering advantages, of designing a partial transparent element, involves applying an absorption layer but no spacer layer in the surface region of the partial transparent element, that is to say in the transparent window. Those advantages are further also achieved if a spacer layer but not an absorption layer is applied in the surface region of the partial transparent element.

It is desirable for the partial thin film element to be made up of an absorption layer and a spacer layer. It is further possible for the partial thin film element to be made up from a relatively large number of layers which have alternately different refractive indices.

The level of anti-forgery security can be further increased by the partial thin film layer having a reflective layer, preferably a metal layer. That improves the recognisability of the partial thin film element.

Alternatively there is also the possibility of providing the partial thin film element with a transmission layer. In that case it is particularly advantageous for that transmission layer to be colored and thus to provide an additional security feature.

Imitation of the optically variable element can be made still more difficult if the partial thin film element is provided with a partial reflective layer, in particular a metal layer, which only partially covers the surface region of the partial thin film element. Besides the increase in the level of anti-forgery security that this entails, that also makes it possible to achieve attractive decorative effects. That therefore increases the array of shapes available for the design configuration of an optically variable element.

These advantages can be achieved by the partial thin film element being provided with a partial diffractive structure which only partially covers the surface region of the partial thin film element.

Those two measures, namely the partial reflective layer and the partial diffractive layer, can also be embodied in parallel.

It is possible for the configurational elements 'partial transparent element with partial reflective layer', 'partial transparent element with partial diffractive structure', and 'partial transparent element with partial thin film structure' to be combined together as desired. An optically variable element according to the invention can thus have a plurality of combinations of valuable security features and affords a large number of attractive configurational features.

BRIEF DESCRIPTION OF THE DRAWINGS

The invention is described hereinafter by way of example by means of a number of embodiments with reference to the accompanying drawings in which.

DETAILED DESCRIPTION OF THE INVENTION

Figure 1:
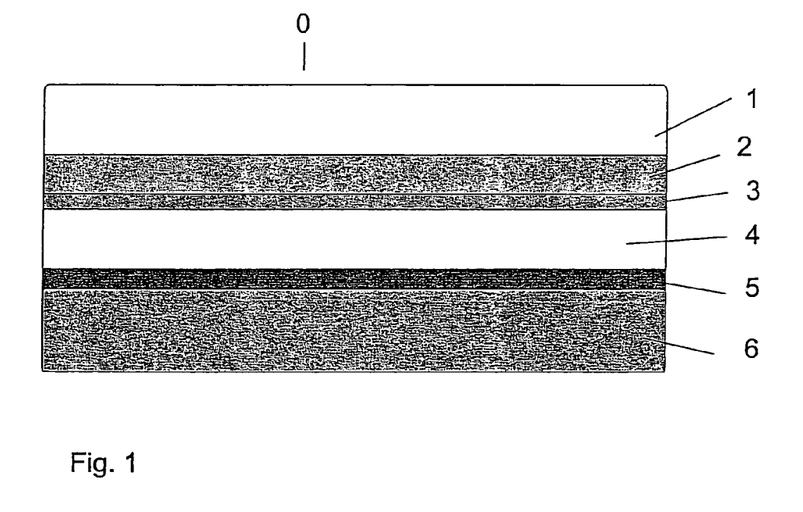
FIG. 1 shows a view in section through an optically variable element.

FIG. 1 shows the structure in principle of an optically variable element 0.

The optically variable element 0 is intended to be applied to a security product, for example a banknote, a credit card, a cash card or a document. There is also the possibility that the optically variable element is intended to be applied as a security or authenticity identification to an article, for example to a CD, or to a packaging.

The optically variable element 0 can assume many different forms. The optically variable element 0 can thus be for example a security thread which is intended to be applied to one of the above-specified objects.

FIG. 1 shows a carrier 1 and five layers 2 through 6. The optically variable element 0 is formed by the layers 2 through 6. The layer 2 is a protective lacquer and/or release layer, the layer 3 is an absorption layer, and the layer 4 is a spacer layer. The layer 5 is a metal layer or an HRI layer (HRI=High Refractive Index). The layer 6 is an adhesive layer.

The carrier 1 comprises for example PET. The carrier serves for producing the optically variable element, from the production-engineering point of view. Upon or after application of the optically variable element to the object to be safeguarded, the carrier 1 is removed. FIG. 1 therefore shows the optically variable element at a stage in which it is part of a foil, for example an embossing foil or a laminating foil.

In the case where the optically variable element 0 is part of a laminating foil, the layer 2 has a bonding layer.

In principle, a thin film is distinguished by an interference layer structure which produces color shifts which are dependent on the viewing angle. It can be in the form of a reflective element, with for example highly reflective metal layers, or in the form of a transmissive element with a transparent optical separation layer of higher refractive index (HRI) or lower refractive index (LRI), in relation to the adjoining layers. The base structure of the thin film has an absorption layer (preferably with between 30% and 65% transmission), a transparent spacer layer as a color change-producing layer (for example λ-quarter or λ-half layer) and a metal layer as a reflective or an optical separation layer as a transmitting layer.

The layers 3, 4 and 5, that is to say the absorption layer, the spacer layer and the metal layer or HRI layer form a thin film which produces color shifts dependent on the viewing angle, by means of interference. In that respect, the color shifts produced by the thin film are preferably in the range of the light which is visible to a human viewer. In addition that thin film is in the form of a partial thin film element which covers the surface region of the optically variable element 0 only in a region-wise and pattern-shaped manner.

If the layer 5 comprises a reflective layer, for example aluminum, then the layer thickness of the spacer layer 4 is to be so selected that the λ/4 condition is satisfied. If the layer 5 comprises a transmissive layer then the spacer layer 4 has to satisfy the λ/2 condition.

It is possible for the partial thin film element to be made up of a succession of high-refractive and low-refractive layers. For example the partial thin film element can be made up of between 3 and 9 such layers (odd number of thin film layers) or between 2 and 10 such layers (even number of thin film layers). The higher the number of layers, the more sharply can the wavelength be set for the color change effect.

Examples of usual layer thicknesses for the individual layers of the partial thin film element and examples of materials which can be used in principle for the layers of the partial thin film element are disclosed in WO 01/03945, page 5, line 30 through page 8, line 5.

The layer 5 can be in the form of a partial metal layer or an HRI layer. The materials for the layer 5 can be for example Al, Ag, Cr, Cu, Au or combinations of those metals.

It is further possible for the layer 5 to have a structured surface. Thus it can have a diffractive structure, a refractive structure (lenses) or macroscopic structures. It can further also have an unstructured, mirror-reflecting or scattering surface.

The optically variable element 0 thus has a partial thin film element which is formed by the only partially provided layers 3, 4 and 5 and/or a partial reflective layer 5. Those partial elements enclose the surface region of a transparent window which is formed in the optically variable element 0 and in which the layers 3, 4 and 5 are absent.

It is possible in principle to forego one or more of the layers shown in FIG. 1. In addition the optically variable element 0 can also have one or more further layers.

Figure 2A:
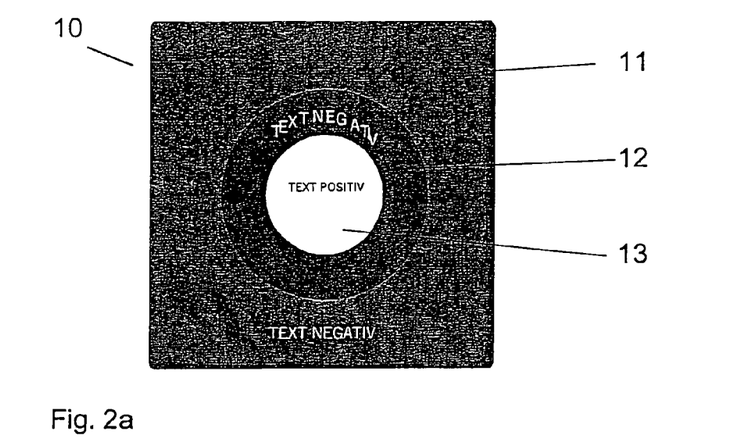
FIG. 2a shows a view of an optically variable element according to the invention, in a first embodiment.
Figure 2B:
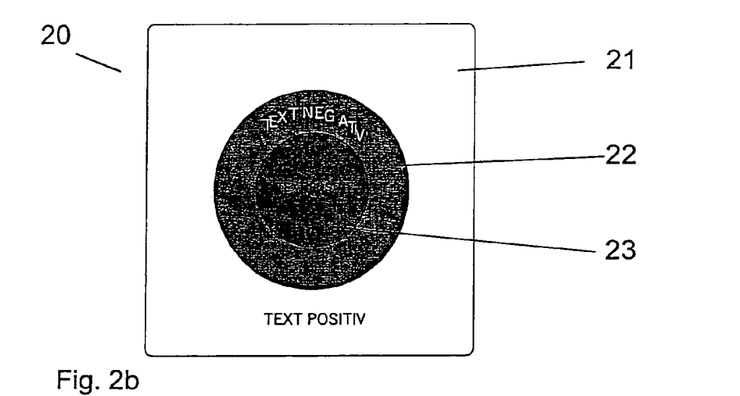
FIG. 2b shows a view of an optically variable element according to the invention, in a second embodiment.
Figure 2C:
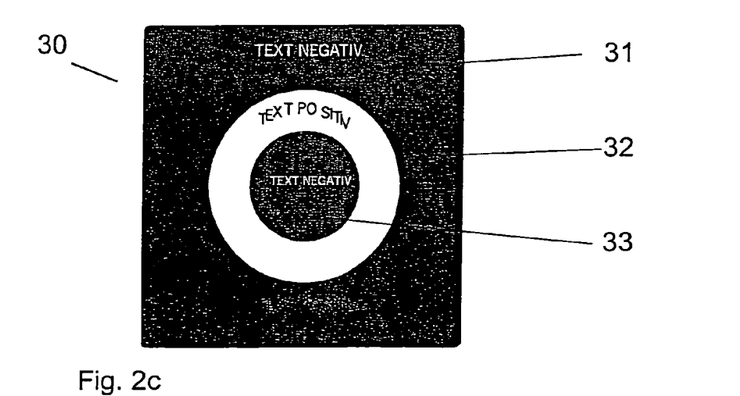
FIG. 2c shows a view of an optically variable element according to the invention, in a third embodiment.

FIGS. 2a through 2c show three optically variable elements 10, 20 and 30 respectively. The optically variable element 10 has three surface regions 11 through 13, the optically variable element 20 has three surface regions 21 through 23 and the optically variable element 30 has three surface regions 31 through 33.

The surface regions 12, 23 and 31 of the optically variable elements 10, 20 and 30 are each covered by a respective partial thin film element. As can be seen from FIGS. 2*a* through 2*c*, the partial thin film element is formed in each case in a region-wise and pattern-shaped manner.

It is possible in this case for the respective partial thin film element to be of a transmissive or reflective nature. A partial, pattern-shaped, both transmissive and also reflective configuration within the respective surface region makes it possible to achieve further attractive effects. In addition the surface regions 12, 23 and 31 can also be provided with a diffractive structure.

The surface regions 11, 22 and 33 of the optically variable elements 10, 20 and 30 respectively are each covered with a partial metallisation. Those surface regions can also be provided with a diffractive structure.

A respective transparent window is visible in each of the surface regions 13, 21 and 32 of the optically variable elements 10, 20 and 30. The transparent windows each have a partial transparent element. That element has transparent or transmissive properties (clear lacquer compositions, oxidic, partially metallised, scattering, transmissive, organic and inorganic compositions). Those surface regions can also be provided with a diffractive structure. The transparent element can have diffractive structures, refractive structures (for example microlenses), macroscopic structures (larger than 5 µm) or a scattering surface. In that respect it is particularly advantageous, as already mentioned above, for that diffractive structure to extend into the adjoining surfaces regions 12, 22 and 31 and 33 respectively. In addition it is also possible for the transparent element to be colored.

It is possible that the transparent window is not enclosed by a single partial element, as shown in FIGS. 2*a* and 2*b*. Rather, it is also possible for two or more partial elements (partial reflective layer, partial thin film element) to jointly enclose the transparent window. Thus it is for example possible for the lower half of the surface 31 in FIG. 2*c* to be formed by a partial thin film element and for the upper half of the surface 31 to be formed by a partial reflective layer.

It is to be emphasised that the diagrammatically illustrated element arrangements of FIGS. 2*a* through 2*c* can all be embodied in register relationship with each other and without limitation in terms of generality, can embrace both graphic image elements, alphanumeric and geometric characters, bar codes and random patterns and combinations thereof.

Figure 3:
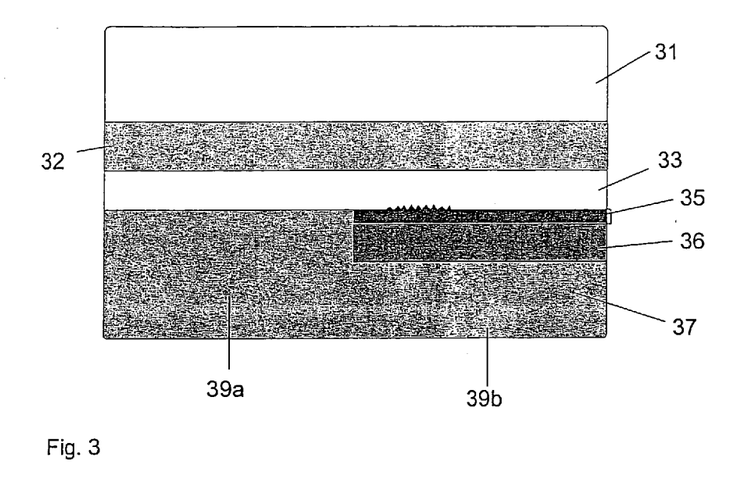
FIG. 3 shows a view in section through an optically variable element according to the invention for a further embodiment of the invention.

FIG. 3 shows a possible way of constructing an optically variable element which is provided with a transparent window.

FIG. 3 shows a carrier 31, five layers 32 through 37 and two surface regions 39*a* and 39*b*.

The layer 32 is a protective lacquer and/or release layer, while the layer 33 is a replication layer formed for example by a replication lacquer. The layer 35 is a metal layer or an HRI layer (HRI=High Refraction Index). The layer 36 is formed by an etching resist. The layer 37 is an adhesive layer.

To produce the layer structure, the protective lacquer and release layer 32, the replication layer 33 and the metal layer 35 are applied to the carrier 31 over the full surface area involved. Then the layer 35 is partially provided with diffractive structures by means of an embossing tool. The metal layer 35 is then printed upon with an etching resist, so that the only partially shaped layer 36 is formed.

The area which is not covered by the etching resist is then removed by etching.

Alternatively, it is also possible for the metal layer 35 to be demetallised or removed by ablation processes such as laser ablation, spark erosion, plasma or ion bombardment. It is possible by means of such ablation processes to transfer digitally stored images, texts and codes.

The intermediate spaces thus provided between the partial layers 35 and 36 form a transparent window. In addition a partial thin film element can be introduced into the intermediate spaces formed in that way between the partial layers 35 and 36 and covers only partial regions of the intermediate spaces. In this case, the layers of the partial thin film element can be applied by vapor deposition with suitably shaped vapor deposition masks or by printing on the layers, in the region of the intermediate spaces.

Figure 4:
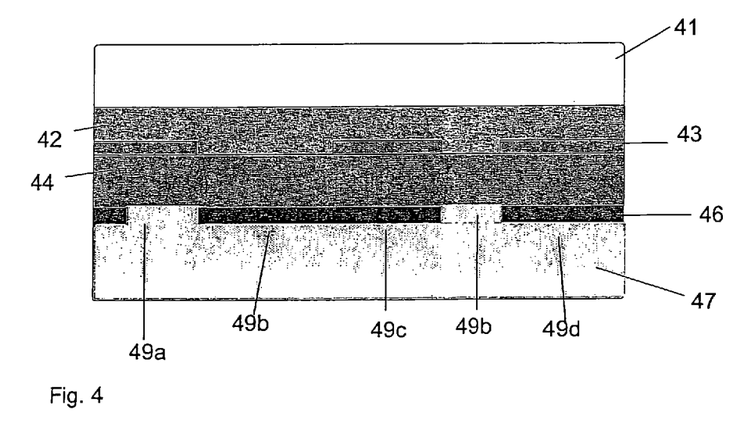
FIG. 4 shows a view in section through an optically variable element according to the invention for a further embodiment of the invention.

FIG. 4 shows an optically variable element in which the surface region of a transparent window has a spacer layer but not an absorption layer.

FIG. 4 shows a carrier 41, five layers 42 through 47 and a plurality of surface regions 49*a* and 49*b*.

The layer 42 is a protective lacquer and/or release layer, and the layer 43 is an absorption layer. The layer 44 is a spacer layer. The layer 46 is a metal layer or an HRI layer (HRI=High Refraction Index). The layer 47 is an adhesive layer.

To produce that layer structure, the protective lacquer and release layer 42 and the absorption layer 43 are applied to the carrier 41 over the full surface area involved. In this case the absorption layer 43 can be applied by vapor deposition or by a printing process.

The absorption layer is then partially removed in the surface regions 49*b*.

That partial removal of the absorption layer is effected by positive etching or negative etching. Thus, in the case of direct etching, an etching agent can be applied in the form of a pattern by a printing process, for example by means of a roller or by screen printing. It is also possible to apply an etching mask which is removed by a washing operation after the etching process.

It is further possible for the absorption layer to be removed by an ablation process such as laser ablation, spark erosion, plasma or ion bombardment. By means of such ablation processes it is possible to transfer digitally stored images, texts and codes.

Instead of the absorption layer being applied over the full surface area, it is also possible for the absorption layer to be applied only partially to the layer 42. That can be effected by vapor deposition by means of vapor deposition masks of a pattern configuration or by correspondingly pattern-shaped printing of the absorption layer 43 on the layer 42.

The spacer layer 44 is now applied over the full surface area involved, to the partially shaped absorption layer 43. The operation of applying the absorption layer can be effected for example by vapor deposition or by printing the absorption layer over the full surface area involved.

After that procedure the surface regions 49*a* are covered with a thin film comprising the absorption layer 43 and the spacer layer 44. That thin film (after application of the further layers which act as optical separation layers) produces color shifts which are dependent on the viewing angle, by means of interference, upon suitable incidence of light. The absorption layer 43 is not present in the surface regions 49*b* so that such color shifts cannot be produced there.

It is further possible for not only the absorption layer 43 but also the spacer layer 44 to be only partially applied to the absorption layer 43 or partially removed.

There is on the one hand the possibility of applying the spacer layer 44 to the partially shaped absorption layer 43 over the full surface area involved and then removing the spacer layer by one of the above-described processes (positive etching, negative etching, ablation) in register relationship with the partially shaped absorption layer.

There is also the possibility of applying the absorption layer 43 and the spacer layer 44 over the full surface area and then removing both layers jointly by one of the above-described processes (positive etching, negative etching, ablation).

There is also the possibility of printing on the spacer layer in register relationship with the partially shaped absorption layer, by means of a printing process.

Alternatively it is also possible for the surface region of the transparent window to have an absorption layer but no spacer layer.

That can be achieved if the absorption layer is applied over the full surface area, for example by vapor deposition or printing. The spacer layer is then only partially applied by a printing process. Here too there is the possibility of the spacer layer being applied over the full surface area and then removed by one of the above-described processes (positive etching, negative etching, ablation).

There is also the possibility of the spacer layer or the absorption layer being altered in respect of its thickness by over-vapor deposition or over-printing, in such a way that it can no longer perform its function and is thus 'extinguished'.

The layer 46 is now applied to the layers 43 and 44 which have been applied and configured in the above-indicated fashion.

If the layer 46 is a reflection layer it preferably comprises a metal. That metal can also be colored. The materials that can be used are essentially chromium, aluminum, copper, iron, nickel or an alloy with those materials.

It is further possible in that case to apply highly shiny or reflective metal pigments which then form the reflection layer.

The reflection layer 46 is in that case only partially applied so that the surface region of the transparent window is not covered by the reflection layer 46. Here too there is the possibility that the layer 46 is first applied over the full surface area, for example by vapor deposition, and then removed by one of the above-described processes (positive etching, negative etching, ablation). Partial vapor deposition using a vapor deposition mask is also possible. If metal pigments are used as the reflective layer, that layer can be partially printed on, thereby then producing a partial reflective layer.

If the layer 46 is in the form of a transmission layer, in particular materials such as oxides, sulfides or chalcogenides can be used as materials for that layer. The crucial consideration in regard to the choice of the materials is that there is a difference in refractive index, in relation to the materials used in the spacer layer 44. That difference should be not less than 0.2 to 0.5. Depending on the respective material used for the spacer layer 44, an HRI material or an LRI material is thus used for the layer 46. In this case the transmission layer can also be formed by an adhesive layer which satisfies that condition in regard to refractive index.

An 'extinguishing effect' as described hereinbefore can further be achieved by partial application of the transmission layer. If the spacer layer is adjoined by a layer (for example an adhesive layer) which does not satisfy the above-described condition in regard to refractive index, the optical thickness of the spacer layer is increased and the interference effect no longer occurs.

As shown in FIG. 4 different partial elements occur due to that procedure in the surface regions 49a through 49d:

The surface region 49a has a transmissive partial thin film element. The surface region 49b has a partial reflective element. The surface regions 49c have a reflective partial thin film element. The surface region 49d has a partial transparent element forming a transparent window.

Figure 5A:
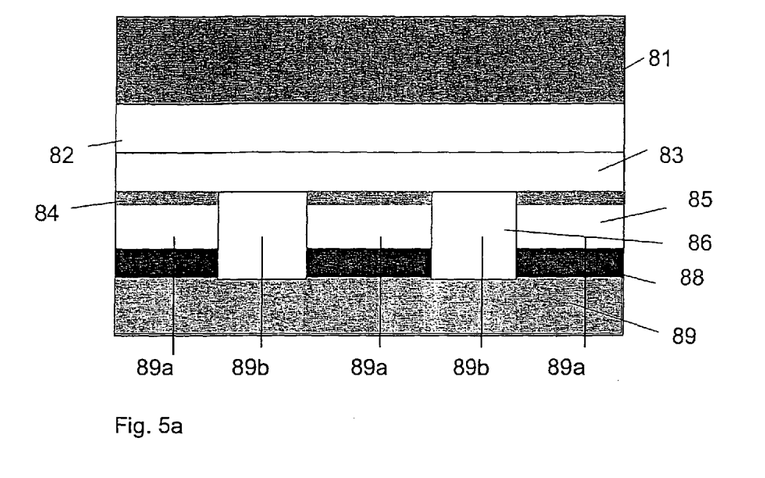
FIG. 5a shows a view in section through an optically variable element according to the invention for a further embodiment of the invention.
Figure 5B:
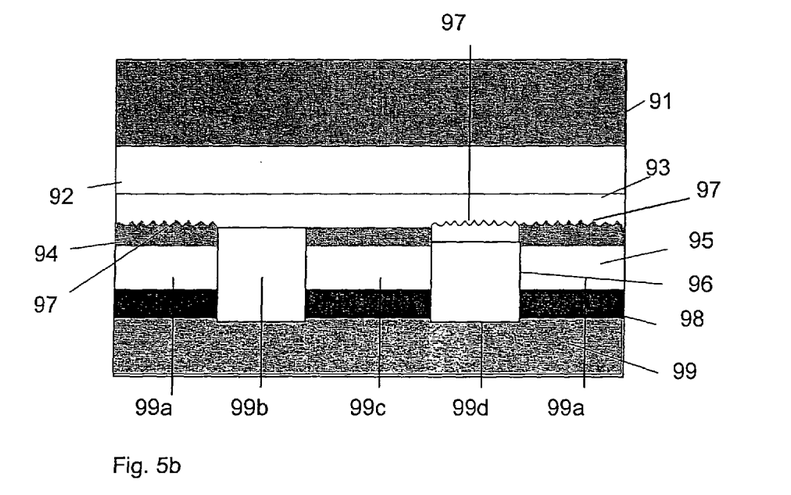
FIG. 5b shows a view in section through an optically variable element according to the invention for a further embodiment of the invention.

Reference is now made to FIGS. 5a and 5b to describe various further possible ways of producing and configuring a transparent partial layer in an optically variable element.

FIG. 5a shows a carrier 81, seven layers 82 through 89 and a plurality of surface regions 89a and 89b. The layer 82 is a protective lacquer and/or release layer. The layer 83 is a replication layer. It would also be possible in this case to forego that layer. The layer 84 is an absorption layer. The layer 84 forms a transparent element. The layer 88 is a metal layer. The layer 89 is an adhesive layer.

The layers 82, 83, 84, 85, 88 and 89 are of the configuration as described in the embodiments shown in FIGS. 3 and 4 and are applied to the carrier 81 as described there.

The layer 86 is formed by a transmissive or transparent material. For example clear lacquer compositions but also oxidic, partially metallised, scattering, transmissive organic or inorganic compositions can be used as the material for the layer 86. The layer 86 is applied to the layer 83 for example by a printing process. The processes described in the embodiments illustrated in FIGS. 3 and 4 can also be used for applying the partial layer 86.

The material used for the layer 86 can also be the same material as the material used for the spacer layer 85.

FIG. 5b shows a carrier 91, seven layers 92, 93, 94, 95, 96, 98 and 99, diffractive structures 97 and a plurality of surface regions 99a through 99d. The layer 92 is a protective lacquer and/or release layer. The layer 93 is a replication layer. The layer 94 is an absorption layer. The layer 96 forms the partial transparent element. The layer 98 is a metal layer. The layer 99 is an adhesive layer.

The layers 92, 93, 94, 95, 98 and 99, are of the configuration as described in the embodiments shown in FIGS. 3 and 4 and are applied to the carrier 91, as described there. The layer 96 is of the configuration as stated in relation to FIG. 5a.

Prior to application of the layer 94 and/or the layer 96, the diffractive structures 97 are applied to the surface of the layer 93 by means of an embossing tool or one of the other above-described processes. As can be seen from FIG. 5b, in this case the diffractive structures 97 can be applied both in surface regions which are covered by the partial transparent element and also can be applied to those surface regions which are not covered by the partial transparent element.

Figure 6:
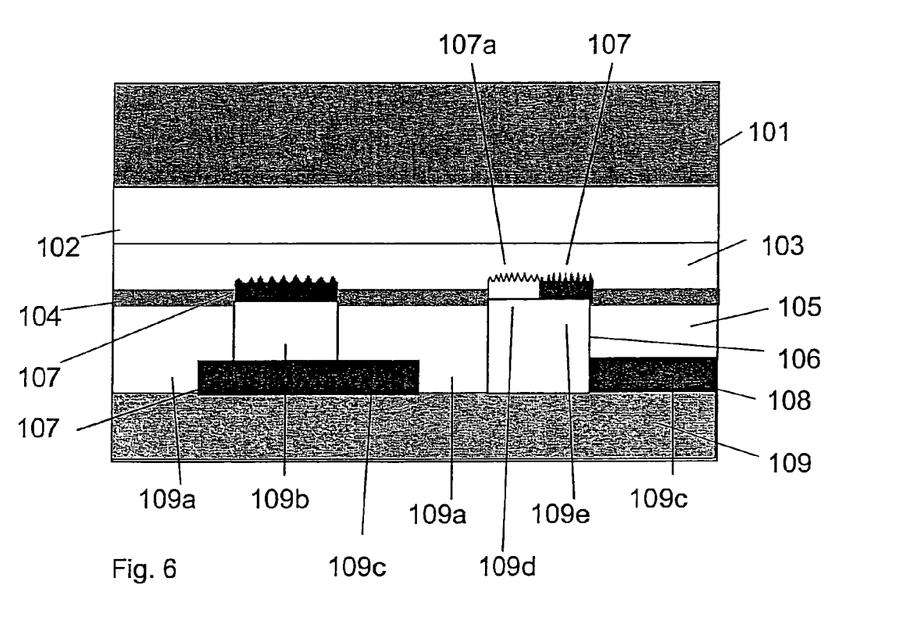
FIG. 6 shows a view in section through an optically variable element according to the invention for a further embodiment of the invention.
Figure 7:
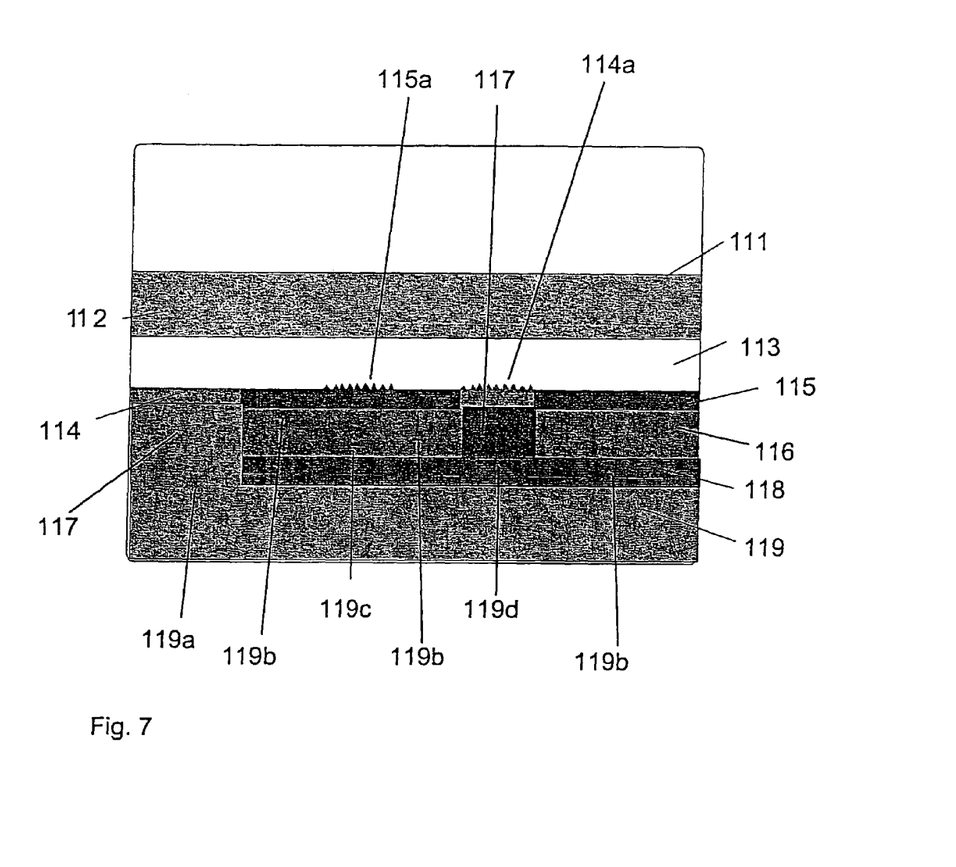
FIG. 7 shows a view in section through an optically variable element according to the invention for a further embodiment of the invention.

FIGS. 6 and 7 show some possible ways of combining a partial transparent element with partial diffractive structures, partial thin film elements and partial reflective layers, FIG. 6 shows a carrier 101, nine layers 102 through 109 and a plurality of surface regions 109a through 109d. The layer 102 is a protective lacquer and/or release layer. The layer 103 is a replication layer. The layer 104 is an absorption layer. The layers 106 and 107a form a partial transparent element and the layers 106 and 107 form a partial reflective element. The layer 108 is a metal layer. The layer 109 is an adhesive layer.

The layers 102, 103, 104, 105, 108 and 109 are of the configuration as described with reference to FIGS. 3 and 4 and are applied to the carrier 101 as described there.

The layer 107 is a metal layer which can be constructed as described in the embodiments shown in FIG. 3. The layers 106 and 107a are formed by a transmissive material. They are of the structure as described in the embodiments illustrated in FIGS. 5a and 5b.

As can be seen from FIG. 6 a diffractive structure is further applied to the layer 103 in the surface regions 109b, 109d and 109e.

Thus the optically variable element illustrated in FIG. 6 has a partial transparent element in the surface region 109d and under some circumstances in the surface regions 109a (depending on the layer thickness of the layer 108). The optically variable element has a partial thin film element in the surface region 109*c*. The optically variable element has a partial reflective element in the surface region 109*b* and 109*e*.

FIG. 7 shows a carrier 111, eight layers 112 through 119 and a plurality of surface regions 119*a* and 119*b*. The layer 112 is a protective lacquer and/or release layer. The layer 113 is a replication layer. The layer 114 is an absorption layer. The layer 117 is a spacer layer. The layer 116 is an etching resist. The layers 115 and 118 are metal layers. The layer 119 is an adhesive layer. The layer 117 is a filling layer which can comprise the same material as the adhesive layer 119.

The layers 112, 113, 114, 117, 118 and 119 are of the configuration as described in the embodiments shown in FIGS. 3 and 4 and are applied to the carrier 111 as described there.

As can be seen from FIG. 7 a diffractive structure 115*a* and 114*a* respectively is further applied to the layer 113 in the surface regions 119*c* and 119*d*.

Thus the optically variable element shown in FIG. 7 has a partial transparent element in the surface region 119*a*. The optically variable element has a partial thin film element in the surface region 119*d*. The optically variable element has a partial reflective layer in the surface regions 119*b* and 119*c*.

The above-described possible processes make it possible to produce suitably adapted individual elements such as a partial transparent window, a partial thin film element, a partial structuring (for example diffractive structures) and a partial metallisation in a degree of positioning accuracy of ±0.2 mm in any positional combination in the form of a continuous or extensive image pattern.

The invention claimed is:

1. An optically variable element comprising:
   a carrier layer;
   a replication layer;
   a partial layer defining a transparent window of the optically variable element, wherein the partial layer encloses a surface region of the transparent window, and wherein said partial layer comprises a thin film layer for producing color shifts by means of interference; and
   an adhesive layer,
   wherein said replication layer is disposed between said carrier layer and said partial layer and said partial layer is disposed between said replication layer and said adhesive layer, and
   wherein said replication layer covers said surface region of said transparent window and said partial layer, and
   wherein the transparent window comprises a diffractive structure for producing diffraction effects, and
   wherein said transparent window comprises a partial transparent element, and wherein said diffractive structure is disposed between said replication layer and said partial transparent element.

2. An optically variable element as set forth in claim 1, wherein the diffractive structure extends both over the surface region of the transparent window and also over a surface region of the partial layer.

3. An optically variable element as set forth in claim 1, wherein there is a difference in level between the transparent window and the partial layer.

4. An optically variable element as set forth in claim 1, wherein the partial transparent element comprises a colored transmission layer.

5. An optically variable element as set forth in claim 1, wherein the partial transparent element has scattering properties.

6. An optically variable element as set forth in claim 1, wherein the partial transparent element comprises an absorption layer but not a spacer layer.

7. An optically variable element as set forth in claim 1, wherein the partial transparent element comprises a spacer layer but not an absorption layer.

8. An optically variable element as set forth in claim 1, wherein the partial layer comprises an absorption layer and a spacer layer.

9. An optically variable element as set forth in claim 1, wherein the partial layer comprises a plurality of layers of different refraction.

10. An optically variable element as set forth in claim 1, wherein the partial layer comprises a transmissive layer.

11. An optically variable element as set forth in claim 1, wherein said thin film layer comprises a reflective layer including a metal layer.

12. An optically variable element as set forth in claim 1, wherein the partial layer is a metallically reflective layer forming a partial reflective layer, the partial reflective layer comprising a metal layer, the metal layer partially covering a surface region of the partial layer.

13. An optically variable element as set forth in claim 1, further comprising a protective lacquer layer disposed between said carrier layer and said replication layer, said protective lacquer layer extending over the surface region of the transparent window and over a surface region of the partial layer.

14. An optically variable element as set forth in claim 1, wherein the adhesive layer extends over the surface region of the transparent window and over a surface region of the partial layer.

15. An optically variable element as set forth in claim 1, wherein said partial layer comprises both of a thin film layer for producing color shifts by means of interference and a metallically reflective layer, said thin film layer and said metallically reflective layer jointly enclosing said surface region of said transparent window.

16. A security product comprising:
    a base layer having at least one of a pattern, text or code disposed thereon; and
    an optically variable element as defined in claim 1 disposed over said base layer, wherein at least a portion of said pattern, text or code is visible through said optically variable element.

17. An optically variable element as set forth in claim 1, adapted for use in at least one of an embossing foil and a laminating foil.

18. An optically variable element as set forth in claim 1, wherein the partial transparent element comprises a transmissive or transparent material.

19. An optically variable element as set forth in claim 18, wherein the material of the partial transparent element is selected from the group consisting of clear lacquer compositions, oxidic compositions, partially metallised compositions, scattering compositions, transmissive organic compositions and transmissive inorganic compositions.

20. An optically variable element comprising:
    a carrier layer;
    a replication layer;
    a partial layer defining a transparent window of the optically variable element, wherein the partial layer encloses a surface region of the transparent window, and wherein said partial layer comprises a thin film layer for producing color shifts by means of interference; and
    an adhesive layer, wherein said replication layer is disposed between said carrier layer and said partial layer and said partial layer is disposed between said replication layer and said adhesive layer, and wherein said replication layer covers said surface region of said transparent window and said partial layer, and wherein the transparent window comprises a diffractive structure for producing diffraction effects, and wherein said transparent window comprises a partial transparent element, and wherein said diffractive structure is disposed between said replication layer and said partial transparent element, and wherein said partial layer borders said partial transparent element such that a surface of said partial layer abuts against a surface of said partial transparent element, said diffractive structure being embossed in said surface of said transparent element and extending into an abutting region of said partial layer surface.

* * * * *